United States Patent
Shi et al.

(10) Patent No.: US 12,279,274 B2
(45) Date of Patent: Apr. 15, 2025

(54) METHOD AND DEVICE FOR CARRIER SCHEDULING

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 273 days.

(21) Appl. No.: 17/885,540

(22) Filed: Aug. 11, 2022

(65) Prior Publication Data
US 2022/0386359 A1    Dec. 1, 2022

Related U.S. Application Data

(63) Continuation of application No. PCT/CN2020/075348, filed on Feb. 14, 2020.

(51) Int. Cl.
*H04W 72/23* (2023.01)
(52) U.S. Cl.
CPC .................. *H04W 72/23* (2023.01)
(58) Field of Classification Search
CPC ....... H04W 72/23; H04L 5/001; H04L 5/0053
See application file for complete search history.

(56) References Cited

U.S. PATENT DOCUMENTS

| | | | | |
|---|---|---|---|---|
| 2011/0228732 | A1* | 9/2011 | Luo | H04L 5/001 370/329 |
| 2015/0180617 | A1* | 6/2015 | Sun | H04L 1/1861 370/329 |
| 2016/0270094 | A1* | 9/2016 | Dinan | H04W 52/365 |
| 2018/0295608 | A1 | 10/2018 | Nguyen et al. | |
| 2019/0074935 | A1* | 3/2019 | Babaei | H04L 1/1854 |
| 2019/0253941 | A1* | 8/2019 | Cirik | H04W 36/0077 |
| 2019/0357238 | A1 | 11/2019 | Zhou et al. | |
| 2020/0221485 | A1* | 7/2020 | Cirik | H04L 5/0051 |
| 2021/0204309 | A1* | 7/2021 | Babaei | H04W 36/0061 |

(Continued)

FOREIGN PATENT DOCUMENTS

| | | |
|---|---|---|
| CN | 101909329 A | 12/2010 |
| CN | 101909360 A | 12/2010 |

(Continued)

OTHER PUBLICATIONS

The supplementary European search report dated Jan. 20, 2023 from European patent Application No. 20918318.5.

(Continued)

*Primary Examiner* — Christine Ng
(74) *Attorney, Agent, or Firm* — BAYES PLLC

(57) ABSTRACT

A method for carrier scheduling includes a first terminal device receiving a first configuration information. The first configuration information is used to indicate the first terminal device to configure at least a first cell and a second cell. The first cell is a primary cell, the second cell is a secondary cell, and at least a portion of data transmission of the first cell is scheduled by a control information transmitted on the second cell.

20 Claims, 3 Drawing Sheets

(56) References Cited

U.S. PATENT DOCUMENTS

2021/0352580 A1* 11/2021 Zhou ................. H04B 7/0413
2024/0292422 A1* 8/2024 Cirik ................. H04W 72/046

FOREIGN PATENT DOCUMENTS

| CN | 102014495 A | 4/2011 |
| CN | 105848292 A | 8/2016 |
| CN | 109274470 A | 1/2019 |

OTHER PUBLICATIONS

NTT Docomo Inc., "Offline summary for PDCCH structure and search space part 2", 3GPP Draft; R1-1811926 SUM AI_7.1.3.1 Search Space2_R3, 3rd Generation Partnership Project (3GPP), Mobile Competence Centre ; 650, Route Des Lucioles ; F-06921 Sophia-Antipolis Cedex ; France, vol. RAN WG1, No. Chengdu, China; Oct. 8, 2018-Oct. 12, 2018, Oct. 9, 2018(Oct. 9, 2018), the whole document.

VIVO, "Discussion on the search space configuration of cross-carrier scheduling", 3GPP Draft; R1-1812277, 3rd Generation Partnership Project (3GPP), Mobile Competence Centre ; 650, Route Des Lucioles ; F-06921 Sophia-Antipolis Cedex ; France, Nov. 3, 2018 (Nov. 3, 2018), the whole document.

Ericsson, "Correction to cross carrier scheduling", 3GPP Draft; R2-1814974 CR 38331-1530 Correction to Cross Carrier Scheduling, 3rd Generation Partnership Project (3GPP), Mobile Competence Centre ; 650, Route Des Lucioles ; F-06921 Sophia-Antipolis CE, vol. RAN WG2, No. Chengdu, China; Oct. 20, 2018, Sep. 27, 2018 (Sep. 27, 2018), the whole document.

The First Office Action dated Apr. 30, 2024 from Chinese patent application No. 202211542782.2.

The Examination Report dated May 24, 2024 from European patent application No. 20918318.5.

International Search Report Dated Nov. 18, 2020 from PCT Application No. PCT/CN2020/075348.

Written Opinion of the International Searching Authority Dated Nov. 18, 2020 from PCT Application No. PCT/CN2020/075348.

Ericsson, "Dynamic spectrum sharing in Rel-17", 3GPP TSG RAN Meeting #84 RP-191052, Jun. 3-6, 2019, p. 3-4.

Ericsson, "On Carrier Aggregation for NR", TSG-RAN WG1#88bis R1-1706058, Apr. 3-7, 2017, the whole document.

LG Electronics, "Remaining issues on NR-LTE DC/coexistence", 3GPP TSG RAN WG1 Meeting #92bis R1-1804564, Apr. 16-20, 2018, the whole document.

Samsung, "CIF configuration for Pcell and Scell", 3GPP TSG RAN WG2#70bis R2-103994, Jun. 28-Jul. 2, 2010, the whole document.

The Examination Report dated Nov. 13, 2023 from European patent application No. 20918318.5.

The Examination Report dated Dec. 18, 2024 from European patent application No. 20918318.5.

* cited by examiner

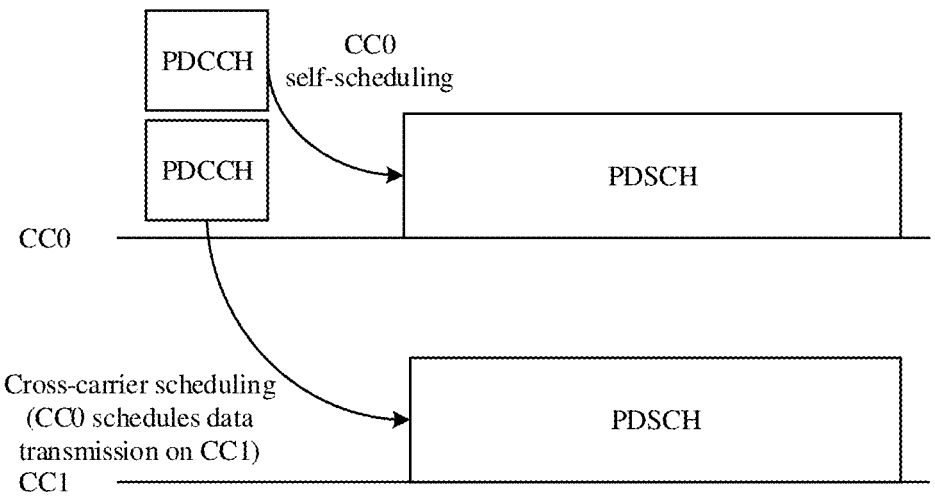

Receiving a first configuration information by a first terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell

Transmitting, to a first terminal device, a first configuration information by the network device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell

FIG. 5

310 — Transmitting, to a first terminal device, a first configuration information by the second terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell

FIG. 6

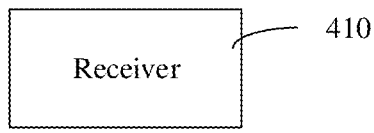

FIG. 7

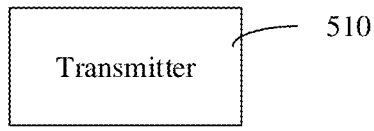

FIG. 8

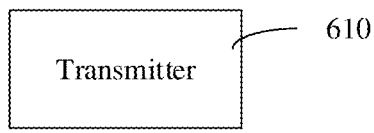

FIG. 9

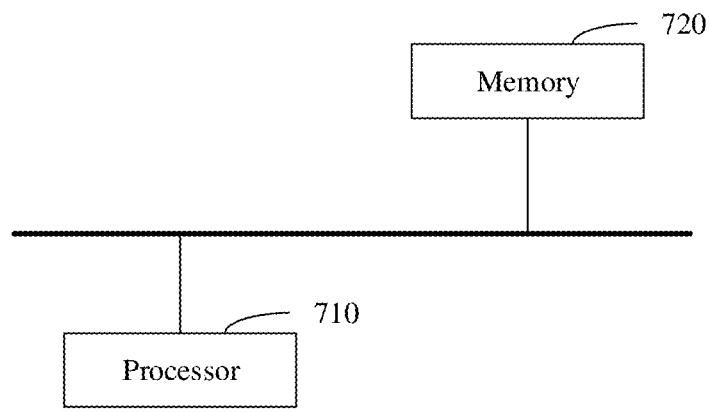

FIG. 10

METHOD AND DEVICE FOR CARRIER SCHEDULING

CROSS-REFERENCE TO RELATED APPLICATION

This application is a continuation of International Application No. PCT/CN2020/075348, entitled "METHOD AND DEVICE FOR CARRIER SCHEDULING", filed on Feb. 14, 2020, which is incorporated herein by reference in in its entirety.

TECHNICAL FIELD

The embodiments of the present application relate to the field of wireless communication technology, and more particularly, to a method and a device for carrier scheduling.

BACKGROUND

When carrier aggregation is performed for multiple carrier components (CC, referred to as carrier) on high frequency and low frequency for cross-carrier data transmission, because a corresponding path loss of a low-frequency spectrum is small, the CC on low frequency used as a primary cell group (primary cell, PCell) is a more common choice. According to the prior art, this system works. However, there are some potential constraints as follows:

Generally, low-frequency spectrum resources are limited, therefore, a corresponding NR (new radio) CC bandwidth is generally small (relative to the high-frequency spectrum, such as NR CC on 3.5 GHz). This results in limited physical downlink control channel (PDCCH) resources, which may lead to a PDCCH congestion, thereby affecting a system performance.

Further, in the existing NR protocol, PCell or PSCell (primary secondary cell) can only be self-scheduling. That is, a data transmission of PDSCH (physical downlink shared channel)/PUSCH (physical uplink shared channel) can only be scheduled through the PDCCH on its own CC, not through the SCell (secondary cell group) to schedule their data transmissions.

In order to further improve the above system performance, improvements are needed to allow other carrier CCs to schedule data transmission on the primary cell. Currently, there is a technical problem that data transmission on the primary cell cannot be scheduled through other carriers.

SUMMARY

The present application provides a method and a device for carrier scheduling to solve the technical problem that data transmission on a primary cell cannot be scheduled through other carriers.

An embodiment of the present application provides a method for carrier scheduling, which is applied to a terminal device, including:

Receiving a first configuration information by a first terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a method for carrier scheduling, which is applied to a network device, including:

Transmitting, to a first terminal device, a first configuration information by the network device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a method for carrier scheduling, which is applied to a second terminal device, including:

Transmitting, to a first terminal device, a first configuration information by the second terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a device for carrier scheduling, including:

A receiver configured for a first terminal device to receive a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a device for carrier scheduling, including:

A transmitter configured for a network device to transmit, to a first terminal device, a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a device for carrier scheduling, including:

A transmitter configured for a second terminal device to transmit, to a first terminal device, a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

An embodiment of the present application provides a terminal device, including: a processor and a memory configured to store a program executable on the processor, wherein the processor is configured to, when running the program, perform any one of the above methods for carrier scheduling.

An embodiment of the present application provides a computer-readable storage medium, storing a computer program, the computer program, when executed, implementing any one of the above methods for carrier scheduling.

An embodiment of the present application provides a computer program product, storing a non-transitory computer-readable storage medium, a computer program, when executed, implementing any one of the above methods for carrier scheduling.

An embodiment of the present application provides a chip, including: a processor for calling and running a computer program from a memory, so that a device installed with the chip performs any one of the above methods for carrier scheduling.

An embodiment of the present application provides a computer program, when executed, implementing any one of the above methods for carrier scheduling.

The technical solutions provided by embodiments of the present application may include the following beneficial effects:

The first terminal device receives the first configuration information, the first configuration information is used to indicate the first terminal device to configure at least a first cell and a second cell, the first cell is a primary cell, the second cell is a secondary cell, and at least part of data transmission of the first cell is scheduled by a control information transmitted on the second cell. Thereby, at least part of the data transmission of the first cell is scheduled by the control information transmitted on the second cell. This implements a scheduling of the first cell through the second cell, that is, data transmission on the primary cell, which solves the technical problem that data transmission on the primary cell cannot be scheduled through other carriers.

It is to be understood that the foregoing general description and the following detailed description are exemplary only and do not limit the application.

BRIEF DESCRIPTION OF THE DRAWINGS

The accompanying drawings, which are incorporated in and constitute a part of this specification, illustrate specific embodiments consistent with the present application and together with the description serve to explain the principles of the present application.

FIG. 3 is a schematic diagram of carrier aggregation of two carriers.

FIG. 4 is a flowchart of a method for carrier scheduling according to Embodiment 1 of the present application.

FIG. 5 is a flowchart of a method for carrier scheduling according to Embodiment 2 of the present application.

FIG. 6 is a flowchart of a method for carrier scheduling according to Embodiment 3 of the present application.

FIG. 7 is a block diagram of a device for carrier scheduling according to Embodiment 4 of the present application.

FIG. 8 is a block diagram of a device for carrier scheduling according to Embodiment 5 of the present application.

FIG. 9 is a block diagram of a device for carrier scheduling according to Embodiment 6 of the present application.

FIG. 10 is a schematic diagram of a hardware structure of a device for carrier scheduling according to Embodiment 7 of the application.

DETAILED DESCRIPTION OF ILLUSTRATED EMBODIMENTS

Exemplary specific embodiments will be described in detail herein, examples of which are shown in the accompanying drawings. When the following description relates to the drawings, unless otherwise stated, the same numbers in different drawings indicate the same or similar elements. Embodiments described in the following exemplary specific embodiments do not represent all embodiments consistent with specific embodiments of the present application. Rather, they are merely examples of methods and apparatuses consistent with some aspects of the present application as detailed in the appended claims. According to the specific embodiments of the present application, all other specific embodiments achieved by a person of ordinary skill in the art without making inventive efforts are within the protection scope of the present application.

Figure 1:
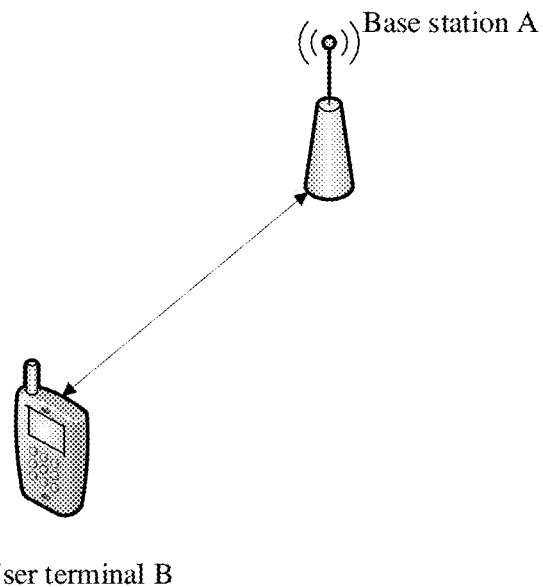
FIG. 1 is a network architecture diagram of a communication system to which embodiments of the present application may be applied.

FIG. 1 is a system architecture of a communication system to which the following specific embodiments of the present application may be applied. The system architecture includes a base station A and a user terminal B.

Figure 2:
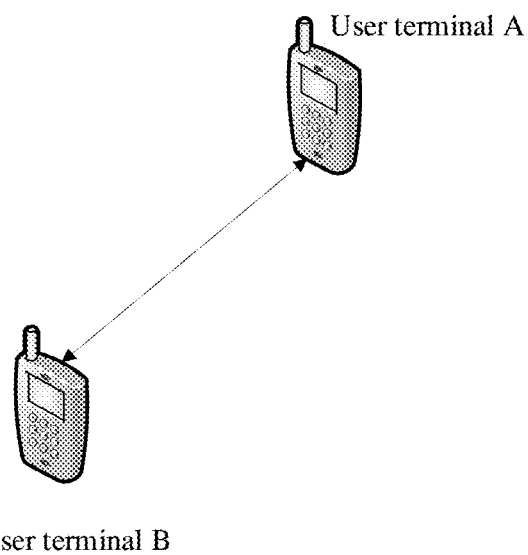
FIG. 2 is a network architecture diagram of a communication system to which embodiments of the present application may be applied.

FIG. 2 is a system architecture of a communication system to which the following specific embodiments of the present application may be applied. The system architecture includes a user terminal A and a user terminal B.

Carrier aggregation (CA) is an important technology for 4G (4th generation mobile communication technology)/LTE (long term Evolution) and 5G (5th generation mobile networks)/NR systems. The basic principle is to perform data transmission on multiple carrier components (CCs) (for simplicity of description, carrier components are often referred to as carriers) to improve system performance There are at least the following scenarios for carrier aggregation:

It is used for communication between a network device and a terminal device.

It is used for communication between terminal devices (such as device-to-device (D2D), vehicle wireless communication technology (Vehicle to X, V2X) and other scenarios).

Carrier aggregation can be subdivided into downlink carrier aggregation (multiple CCs are used for downlink data transmission) and uplink carrier aggregation (multiple CCs are used for uplink data transmission). Data transmission refers to downlink data transmission and/or uplink data transmission. For the sake of example, only PDSCH is exemplified in this application, but it can also be used for PUSCH, which is not limited in this application.

Carrier aggregation mainly has the following benefits:

Transmission rate can be improved by communicating with a terminal simultaneously through multiple carriers (CCs).

By flexibly scheduling among multiple CCs, it is possible to effectively avoid excessive service compliance on a single carrier, can better balance a business load among multiple CCs, and improve an overall system performance and user experience.

Through cross-carrier scheduling (that is, PDCCH is in one CC, and its scheduled data transmission of PDSCH/PUSCH is in another CC), a scheduling restriction caused by a congestion of a control channel can be reduced, and a transmission performance can be improved.

The advantage of CA is that the issue of PDCCH congestion on some carriers can be effectively avoided through cross-carrier scheduling.

FIG. 3 is a schematic diagram of carrier aggregation of two carriers (taking a scheduling of downlink data transmission of PDSCH as an example). As illustrated in FIG. 3, the two carriers are CC0 and CC1:

Data transmission on CC0 is scheduled by the PDCCH on CC0 (we simply call it self-scheduling).

Data transmission on CC1 is scheduled by PDCCH on CC0 (we simply call it cross-carrier scheduling, i.e., CC0 schedules CC1).

When using cross-carrier scheduling, there is a special carrier indicator field (CIF) in the corresponding DCI (downlink control information), and its corresponding value is used to indicate which carrier CC corresponds to the PDSCH currently scheduled by the DCI.

If the CIF field does not exist (there is no cross-carrier scheduling), it corresponds to a length of 0 bits.

If the CIF field exists (cross-carrier scheduling exists), it corresponds to a length of 3 bits.

In the NR protocol, an RRC (radio resource control) signaling configuration of self-scheduling and cross-carrier scheduling adopts the following methods:

The configuration information IE (information element) ServingCellConfig (serving cell configuration) corresponding to a CC contains an RRC IE CrossCarrierScheduling-Config (cross-carrier scheduling configuration).

In the above IE, configure whether the data transmission on this CC is self-scheduling or cross-carrier scheduling (that is, the PDCCH on other CCs is required to schedule itself).

The configuration parameter, own, indicates self-scheduling.

The configuration parameter, other, indicates cross-carrier scheduling. In addition, it is also necessary to configure the CC number (schedulingCellId) where the PDCCH that schedules its own data is located and configure the number corresponding to its own carrier in the CIF (cif-InSchedulingCell).

In the existing NR protocol, PCell or PSCell can only self-schedule. That is, the data transmission of PDSCH/PUSCH can only be scheduled through the PDCCH on its own CC, and their data transmission is not scheduled through the SCell.

The low-frequency spectrum has been widely used in communication systems such as 2G (2-Generation wireless telephone technology)/3G (3-Generation wireless telephone technology)/4G. Relatively high-frequency spectrum (such as 3.5 GHz), low-frequency spectrum is currently more abundant, therefore, it is widely used in NR systems. The coverage of the higher frequency band is limited, and the low frequency domain is very attractive for NR.

Low-frequency spectrum path loss is small, coverage is large, and reliability is better.

Some frequency bands of previous systems (such as 2G/3G/4G) can be reframed to deploy NR.

Therefore, it may be a common phenomenon to deploy 5G/NR systems on the low-frequency spectrum in the future. When NR is deployed on both high and low frequencies, an efficient way to use multiple frequency bands simultaneously is to use carrier aggregation. That is, the CC on the low frequency and the high frequency is used for data transmission at the same time. On the one hand, it can improve a reliability of data transmission, and it can also improve a rate of data transmission and improve an overall performance of the system.

In NR, DCI is transmitted on a control channel (PDCCH). DCI may be used to indicate and schedule corresponding data transmissions (e.g., PDSCH or PUSCH). Assuming cross-carrier scheduling (the control channel on CC0 schedules data transmission on CC1), then CC1 transmits data, and its corresponding control channel-related configuration is also associated with CC1. However, when a terminal monitors the PDCCH, the terminal needs to go to the CC0 to monitor the corresponding DCI.

In NR, the configuration of the control channel is divided into two layers:

Control resource set (CORESET).

A search space (SS) is configured on the basis of CORESET, and the search space is divided into two categories:

Common search space (CSS): A search space shared by one or more or all terminal devices in the same cell.

User search space (USS) (UE-specific search space): a specific UE's own search space.

Search space can also be called search space set. For simplicity of description, it can be referred to as search space.

In the existing NR protocol, PCell or PSCell can only self-schedule. That is, the data transmission of PDSCH (physical downlink shared channel)/PUSCH (physical uplink shared channel) can only be scheduled through the PDCCH on its own CC, and their data transmission cannot be scheduled through the SCell (secondary cell group).

In this application, unless otherwise specified, the primary cell includes PCell and PSCell.

The following specific embodiments of the present application will describe in detail how to allow other carriers to schedule data transmission on the primary cell, so as to solve the technical problem that data transmission on the primary cell cannot be scheduled through other carriers.

In the present system architecture, the example communication system may be a global system of mobile communication (GSM) system, a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, an advanced long term evolution (LTE-A) system, a new radio (NR) system, an advanced system of a NR system, an LTE-based access to unlicensed spectrum (LTE-U) system, a NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system or other communication systems, etc.

In general, a limited number of connections are supported by traditional communication systems and are easy to implement. However, with the development of communication technology, mobile communication systems will not only support traditional communication, but should also support, for example, device to device (D2D) communication, machine to machine (M2M) communication, machine type communication (MTC), vehicle to vehicle (V2V) communication, and vehicle wireless communication technology (Vehicle to X, V2X), etc. Embodiments of the present application can also be applied to these communication systems.

The exemplary communication system, for example, may be a 5G NR system or other similar communication systems. The exemplary communication system specifically includes a network device and a terminal. When the terminal accesses a mobile communication network provided by the network device, a communication connection between the terminal and the network device is provided through a radio link. The mode of the communication connection may be a single-link mode, or a dual-link mode, or a multi-link mode. When the mode of the communication connection is the single-link mode, the network device may be an LTE base station or an NR base station (also known as a gNB base station). When the communication mode is the dual-link mode (specifically, it can be implemented by a carrier aggregation (CA) technology or implemented by multiple network devices). The terminal related to implementations of the present application may include various devices (such as handheld devices, vehicular devices, wearable devices, computing devices)

with wireless connection capability, or other processing devices connected to a wireless modem, and various user equipment (UEs), mobile stations (MSs), terminal devices, and the like. For ease of description, the devices mentioned above are all referred to as terminal.

In addition, the terms "system" and "network" are often used interchangeably herein. The term "and/or" as used herein only represents a relationship between correlated objects, including three relationships. For example, "A and/or B" may mean A only, B only, or both A and B. In addition, the symbol "I" as used herein represents an "or" relationship between the correlated objects preceding and succeeding the symbol.

It can be understood that, in the embodiments of the present application, "B associated with A" means that B is associated with A, and B can be determined from A. However, it can also be appreciated that B being determined from A does not mean that B can be determined from A only but can be determined from A and/or other information.

FIG. 4 is a flowchart of a method for carrier scheduling according to Embodiment 1 of the present application. As illustrated in FIG. 4, the method for carrier scheduling is applied to terminal device, and may include the following steps:

In step 110, receiving a first configuration information by a first terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

Scheduling the data transmission of the primary cell through the secondary cell can avoid the congestion of the control channel of the primary cell, which may result in limited scheduling of the primary cell and data transmission of the primary cell and improve the overall performance of carrier aggregation. The primary cell may include PCell or PSCell. Data transmission includes downlink data transmission and/or uplink data transmission. Data transmission includes downlink data transmission and/or uplink data transmission. In the specific embodiment of the present application, only downlink data transmission is described for the sake of example, but it can also be used for uplink data transmission, which is not limited in the present application.

Optionally, if the first terminal device is configured with a cell group, the first cell corresponds to the primary cell in the current cell group (first cell group). Specifically, it is a PCell in an MCG (master cell group, primary cell group) or a PSCell in an SCG (secondary cell group). The second cell corresponds to the secondary cell in the first cell group.

Optionally, the first configuration information is transmitted through at least one of followings:

the first configuration information being transmitted through a radio resource control (RRC) signaling;

the first configuration information being sent to the first terminal device through a network device; and/or the first configuration information being sent to the first terminal device through a second terminal device.

The first configuration information is sent to the first terminal device through the second terminal device and is applied to a scenario where a terminal device communicates with a terminal device, such as D2D, V2X, sidelink, etc.

Optionally, the first cell and the second cell are used for data transmission between the first terminal device and the network device. It is used in the scenario where the terminal device communicates with the network device.

Optionally, the first cell and the second cell are used for data transmission between the first terminal device and the second terminal device. It is used for a scenario where a terminal device communicates with a terminal device, such as D2D, V2X, sidelink, etc.

Optionally, the control information transmitted on the second cell is transmitted through the PDCCH channel on the second cell.

Optionally, the control information transmitted on the second cell is carried by the DCI on the second cell.

Optionally, the data transmission may be a data transmission (e.g., PUSCH) sent from the first terminal device to the counterparty and/or a data transmission (e.g., PDSCH) received by the first terminal device.

Optionally, the carrier scheduling method further includes:

In step 120, receiving a second configuration information by the first terminal device, wherein the second configuration information is used to indicate that the second cell can schedule at least part of the data transmission of the first cell.

Optionally, the second configuration information is transmitted through at least one of followings:

the second configuration information being transmitted through an RRC signaling;

the second configuration information being transmitted through a medium access control control element (MAC CE) signaling; and/or the second configuration information being transmitted through a downlink control information (DCI) signaling.

The second configuration information is transmitted through RRC signaling. The content of RRC signaling is flexible, and good flexibility can be obtained. The second configuration information is transmitted through medium access control control element (MAC CE) signaling. Compared with RRC signaling, MAC CE signaling has a shorter delay and can indicate faster. The second configuration information is transmitted through downlink control information (DCI) signaling. Compared with the RRC signaling and the MAC signaling, the DCI signaling has a shorter delay and can indicate faster. Here, the second configuration information is transmitted through downlink control information (DCI) signaling, including that the second configuration information is indicated through an RNTI (radio network temporary identity) corresponding to the PDCCH carrying the DCI signaling. Subsequent information related to the transmission of certain information through DCI signaling may include this information and be indicated through the RNTI corresponding to the PDCCH carrying the DCI signaling, which will not be repeated. Optionally, the second configuration information includes at least one of the followings:

the first configuration information carrying the second configuration information;

a serving cell configuration (ServingCellConfig) signaling corresponding to the first cell carrying the second configuration information; and/or a cross carrier scheduling configuration (CrossCarrierSchedulingConfig) signaling corresponding to the first cell carrying the second configuration information.

Optionally, at least part of the data transmission of the first cell further includes:

At least part of the data transmission of the first cell is performed by the first cell self-scheduling.

When the primary cell is located in a lower frequency band, due to the smaller path loss, the corresponding transmission coverage is better, and the robustness is better. Therefore, the primary cell can also perform self-scheduling, which can effectively ensure the coverage and transmission reliability of the entire system. On the contrary, if the cross-carrier scheduling can only be performed through the second cell in a relatively high frequency band, issues of small coverage and low transmission reliability may be faced.

Optionally, the method for carrier scheduling further includes:

In step 130, receiving a third configuration information by the first terminal device, wherein the third configuration information is used to indicate that at least part of the data transmission of the first cell can be self-scheduled by the first cell.

It is indicated by the third information that at least part of the data transmission of the first cell can be self-scheduled by the first cell, thereby obtaining better flexibility.

Optionally, the method for carrier scheduling further includes:

In step 140, at least part of the data transmission of the first cell being self-scheduled by the first cell according to a protocol.

According to the protocol, the data transmission of the first cell is self-scheduled by the first cell, which reduces signaling transmission and signaling overhead. That is, if a primary cell is configured with a secondary cell that can schedule data transmission of the primary cell across carriers, the primary cell can also perform self-scheduling by itself according to the protocol.

Optionally, the method for carrier scheduling further includes:

In step 150, according to a configuration information of a first search space corresponding to the first cell, determining that the first terminal device monitors a physical downlink control channel (PDCCH) candidate corresponding to the first search space in the first cell and/or the second cell.

Optionally, the configuration information of the first search space includes:

A type of the first search space, and/or, a DCI format supported by the first search space, and/or, an aggregation level supported by the first search space.

Optionally, the step 150 may include the following steps:

when the first search space is a common search space and/or the second cell is not activated, the first terminal device monitors the PDCCH candidate corresponding to the first search space on the first cell;

when the first search space is a user search space and the second cell is activated, the first terminal device monitors the PDCCH candidate corresponding to the first search space on the second cell; and/or when the first search space is a user search space, the first search space supports a DCI format 0_1 and a DCI format 1_1, and the second cell is activated, the first terminal device monitors the PDCCH candidate corresponding to the first search space on the second cell.

When the first search space is the common search space (CSS), the first terminal device monitors the physical downlink control channel candidate set (PDCCH candidate) corresponding to the first search space on the first cell. The common search space is in the first cell of low frequency, which can effectively guarantee reliability and robustness of a communication link and provide guarantee for a fallback mode. Optionally, the first search space corresponding to the first cell is indicated by a broadcast message or system information of the first cell. Optionally, the first search space corresponding to the first cell is indicated by RRC signaling.

When the first search space is the user search space (USS), the first terminal device monitors the PDCCH candidate corresponding to the first search space on the activated second cell. Transmission of the PDCCH candidate in the USS in the relatively high-frequency second cell can effectively reduce the congestion probability of the control channel in the first cell and improve system performance. If the second cell is not activated, the first terminal device monitors the PDCCH candidate corresponding to the first search space on the first cell. If the second cell has been activated, the first terminal device monitors the PDCCH candidate corresponding to the first search space on the second cell. Therefore, the USS is still monitored in the first cell before the second cell is not activated, which can improve the probability of data transmission scheduling of the first terminal device and improve the performance. When the second cell is activated, the PDCCH candidate in the USS is transmitted on the second cell, which can reduce the congestion probability of the control channel of the first cell and improve the performance.

When the first search space is the user search space (USS), the first search space supports a DCI format 0_1 and a DCI format 1_1, and the second cell is activated, the first terminal device monitors the PDCCH candidate corresponding to the first search space on the second cell. Transmission of the PDCCH candidate in the USS in the relatively high-frequency second cell can effectively reduce the congestion probability of the control channel in the first cell and improve system performance. Moreover, DCI formats 0_1 and 1_1 can support more domains and occupy more resources. Transmission of DCI formats 0_1 and 1_1 in the relatively high-frequency second cell can effectively reduce the congestion probability of the control channel in the first cell and improve system performance.

Optionally, this step 150 may include the following steps:

when the first search space supports a DCI format 0_0 and a DCI format 1_0 and/or the second cell is not activated, the first terminal device monitors the PDCCH candidate corresponding to the first search space on the first cell; and/or when the first search space supports a DCI format 0_1 and a DCI format 1_1 and the second cell is activated, the first terminal device monitors the PDCCH candidate corresponding to the first search space on the second cell.

When the first search space supports DCI format 0_0 and DCI format 1_0, the first terminal device monitors the PDCCH candidate corresponding to the first search space on the first cell. DCI formats (formats) 0_0 and 1_0 belong to basic DCI formats, which may also be called fallback formats, and their transmission affects the most basic performance of the system. Therefore, the transmission in the low-frequency first cell can effectively guarantee reliability and robustness of the communication link and further provide guarantee for a fallback mode.

When the first search space supports DCI format 0_1 and DCI format 1_1, the first terminal device monitors the PDCCH candidate corresponding to the first search space on the activated second cell. DCI formats 0_1 and 1_1 can support more domains and occupy more resources. Transmission of DCI formats 0_1 and 1_1 in the relatively high-frequency second cell can effectively reduce the congestion probability of the control channel on the first cell and improve system performance. If the second cell is not activated, the first terminal device monitors the PDCCH candidate corresponding to the first search space on the first cell. If the second cell has been activated, the first terminal device monitors the PDCCH candidate corresponding to the first search space on the second cell. Before the second cell is not activated, the DCI formats 0_1 and 1_1 are still monitored in the first cell, which can improve the probability of data transmission scheduling of the first terminal device and improve the performance After the second cell is activated, the DCI formats 0_1 and 1_1 are transmitted on the second cell, which can reduce the congestion probability of the control channel of the first cell and improve the performance.

When the maximum aggregation level supported by the first search space is greater than or equal to a first threshold, the first terminal device monitors the PDCCH candidate corresponding to the first search space on the first cell. The large aggregation level of PDCCH is mainly to ensure coverage. Therefore, the transmission in the low-frequency first cell can effectively guarantee reliability and robustness of the communication link and provide guarantee for a fallback mode.

Optionally, this step 150 may include the following steps:

When the maximum aggregation level supported by the first search space is greater than or equal to the first threshold, the first terminal device monitors the PDCCH candidate corresponding to the first search space on the activated second cell. PDCCHs with large aggregation levels occupy more resources. Therefore, transmitting the PDCCH candidate in the USS in the relatively high-frequency second cell can effectively reduce the congestion probability of the control channel in the first cell and improve the system performance. If the second cell is not activated, the first terminal device monitors the PDCCH candidate corresponding to the first search space on the first cell. If the second cell has been activated, the first terminal device monitors the PDCCH candidate corresponding to the first search space on the second cell. Before the second cell is not activated, monitoring is still performed in the first cell, which can improve the probability of data transmission scheduling of the first terminal device and improve the performance. When the second cell is activated, the PDCCH candidate with a large aggregation level is transmitted on the second cell, which can reduce the congestion probability of the control channel of the first cell and improve the performance.

When the maximum aggregation level supported by the first search space is less than or equal to the first threshold, the first terminal device monitors the PDCCH candidate corresponding to the first search space on the first cell. PDCCHs with small aggregation levels occupy less resources. Therefore, the transmission in the low-frequency first cell can effectively reduce the collision probability of control channel resources and reduce the probability of control channel congestion.

When the maximum aggregation level supported by the first search space is less than or equal to the first threshold, the first terminal device monitors the PDCCH candidate corresponding to the first search space on the activated second cell. The PDCCH candidate in the partial search space is transmitted in the relatively high-frequency second cell, which can effectively reduce the congestion probability of the control channel in the first cell and improve the system performance. If the second cell is not activated, the first terminal device monitors the PDCCH candidate corresponding to the first search space on the first cell. If the second cell has been activated, the first terminal device monitors the PDCCH candidate corresponding to the first search space on the second cell. Before the second cell is not activated, the detection is still performed in the first cell, which can improve the probability of data transmission scheduling of the first terminal device and improve the performance After the second cell is activated, the PDCCH candidate in part of the search space is transmitted on the second cell, which can reduce the congestion probability of the control channel of the first cell and improve the performance.

The first threshold is configured by the network or specified by the protocol.

Optionally, the method for carrier scheduling further includes:

In step 160, receiving, by the first terminal device, a fourth configuration information, wherein the fourth configuration information is used to determine that the first terminal device monitors the first search space corresponding to the first cell in the first cell and/or the second cell.

Optionally, the method for carrier scheduling further includes:

when the first terminal device does not receive the fourth configuration information, the first terminal device monitors all search spaces corresponding to the first cell on the first cell;

the first terminal device monitoring all search spaces corresponding to the first cell in the activated second cell;

the first terminal device monitoring search spaces of all RRC configurations corresponding to the first cell in the activated second cell;

the first terminal device monitoring a search space indicated by a broadcast message or a system message corresponding to the first cell in the first cell;

the first terminal device monitoring a user search space corresponding to the first cell in the activated second cell; and/or the first terminal device monitoring a common search space corresponding to the first cell in the first cell.

This method is a default configuration, which can reduce signaling overhead. The first terminal device monitors the search spaces of all RRC configurations corresponding to the first cell in the activated second cell. The search space indicated by the broadcast message or the system message is still monitored on the first cell, and only the search space configured by the RRC is monitored on the second cell. On the one hand, the reliability of messages oriented to multiple terminal devices can be ensured and the occurrence of ambiguous periods can be avoided. In addition, the congestion probability of the control channel on the first cell can be reduced, and the overall performance of the system can be improved.

If the second cell is not activated, the first terminal device monitors all search spaces corresponding to the first cell on the first cell. If the second cell has been activated, the first terminal device monitors the search spaces of all RRC configurations corresponding to the first cell on the second cell.

The first terminal device monitors the user search space of the first cell in the activated second cell, and/or the first terminal device monitors the public search space corresponding to the first cell in the first cell.

Optionally, the fourth configuration information includes at least one of followings:

a serving cell configuration (ServingCellConfig) signaling corresponding to the first cell carrying the fourth configuration information;

a cross carrier scheduling configuration (CrossCarrier-SchedulingConfig) signaling corresponding to the first cell carrying the fourth configuration information;

a configuration information of the first search space carrying the fourth configuration information; and/or a first control resource set (CORESET) corresponding to the first search space carrying the fourth configuration information.

Optionally, the fourth configuration information indicates the first terminal device to monitor the first search space corresponding to the first cell in the first cell and/or the second cell and/or indicates the first terminal device to monitor a search space corresponding to the first CORESET in the first cell and/or the second cell.

The serving cell configuration (ServingCellConfig) signaling corresponding to the first cell carries the fourth configuration information. Introducing a new field to indicate, on the one hand can provide maximum flexibility, on the other hand does not change the design of other RRC IEs. The fourth configuration information indicates the first terminal device to monitor the search space corresponding to the first control resource set (CORESET) in the first cell and/or the second cell. One CORESET can correspond to multiple search spaces. Therefore, indicating CORESET is equivalent to indicating multiple search spaces. Therefore, signaling overhead can be saved. The fourth configuration information indicates the first terminal device to monitor the first search space corresponding to the first cell in the first cell and/or the second cell. For search space indication, maximum flexibility can be provided. That is, it is possible to flexibly indicate on which cell each search space is monitored.

The fourth configuration information is carried in the cross-carrier scheduling configuration (CrossCarrierSchedulingConfig) signaling corresponding to the first cell. Introducing a new field to indicate, on the one hand can provide maximum flexibility, on the other hand does not change the design of other RRC IEs. The fourth configuration information indicates CORESET information corresponding to the first search space. One CORESET can correspond to multiple search spaces. Therefore, indicating CORESET is equivalent to indicating multiple search spaces. Therefore, signaling overhead can be saved. The fourth configuration information indicates search space information corresponding to the first search space. Search space indication can provide maximum flexibility. That is, it is possible to flexibly indicate on which cell each search space is monitored.

The configuration information of the first search space carries the fourth configuration information. Each search space is indicated individually to provide maximum flexibility. That is, it is possible to flexibly indicate on which cell each search space is monitored.

The first control resource set (CORESET) corresponding to the first search space carries the fourth configuration information. One CORESET can correspond to multiple search spaces. Therefore, indicating CORESET is equivalent to indicating multiple search spaces, signaling overhead can be saved.

Optionally, the method for carrier scheduling may include the following steps:

when the fourth configuration information indicates the first terminal device to monitor the first search space in the first cell, and/or the second cell is not activated, the first terminal device monitors the PDCCH candidate corresponding to the first search space on the first cell;

when the fourth configuration information indicates the first terminal device to monitor the first search space in the second cell and the second cell is activated, the first terminal device monitors the PDCCH candidate corresponding to the first search space on the second cell; and/or when the fourth configuration information indicates the first terminal device to monitor the first search space in the first cell and the second cell and the second cell is activated, the first terminal device monitors the PDCCH candidate corresponding to the first search space on the first cell and the second cell.

Optionally, the fourth configuration information is transmitted through at least one of followings:

the fourth configuration information being transmitted through an RRC signaling;

the fourth configuration information being transmitted through an MAC CE signaling; and/or the fourth configuration information being transmitted through a DCI signaling.

The fourth configuration information is transmitted through RRC signaling. The content of RRC signaling is flexible, and good flexibility can be obtained. The fourth configuration information is transmitted through medium access control control element (MAC CE) signaling. Compared with RRC signaling, MAC CE signaling has a shorter delay and can indicate faster. The fourth configuration information is transmitted through downlink control information (DCI) signaling. Compared with RRC signaling and MAC signaling, DCI signaling has a shorter delay and can indicate faster.

Optionally, part or all of the second configuration information, the third configuration information, and the fourth configuration information are transmitted through the same signaling, or part or all of the second configuration information, the third configuration information, and the fourth configuration information are the same information.

This method can reduce signaling overhead.

Optionally, the method for carrier scheduling may include the following steps:

In step 170, receiving a fifth configuration information by the first terminal device, wherein the fifth configuration information is used to activate the second cell, and the first terminal device monitors PDCCH candidates associated with the first cell and the second cell on the second cell.

Optionally, the fifth configuration information is transmitted through at least one of followings:

the fifth configuration information being transmitted through an MAC CE signaling; and/or the fifth configuration information being transmitted through a DCI signaling.

The fifth configuration information is transmitted through the medium access control control element (MAC CE) signaling. The fifth configuration information is transmitted through downlink control information (DCI) signaling, which can reduce activation delay and improve performance.

Optionally, the first terminal device receives the cross-carrier scheduling configuration information (CrossCarrierSchedulingConfig) corresponding to the first cell, in which a field is added on the existing basis to indicate whether it can be indicated to be scheduled by other cells and related configuration information.

The first cell is the primary cell, such that the original protocol cannot configure other in schedulingCellInfo (scheduling cell information) and can only configure own.

Now add a new field outside the schedulingCellInfo, denoted as other1, which configures a scheduling cell information that can be used to schedule the first cell and a value of a corresponding carrier indicator field. Optionally, there may be no subfield corresponding to the value of the carrier indicator field. That is, the value corresponding to the carrier indicator field adopts a predetermined value. Optionally, the other1 field can be configured only when the corresponding cell is the primary cell (PCell or PSCell), and the secondary cell (SCell) cannot be configured with this field.

In the cross-carrier scheduling configuration information received by the first terminal device, the field schedulingCellInfo is configured with own, and the field other1 is configured (assuming schedulingCellId indicates the second cell), the first terminal device knows that both the first cell and the second cell can schedule data parameters on the first cell.

The specific protocol is as follows:

| Other1 SEQUENCE { | -- Cross carrier scheduling: scheduled cell |
|---|---|
| schedulingCellId | ServCellIndex, |
| cif-InSchedulingCell | INTEGER (1..7) |
| } | OPTIONAL, |

Modifying on the basis of the existing RRC IE CrossCarrierSchedulingConfig can reduce the complexity involved in the protocol.

The location and name of the newly added domain in this specific embodiment are only exemplary implementations, and the location and name of the newly added domain are not limited in this application.

Optionally, the first terminal device receives the cross-carrier scheduling configuration information CrossCarrierSchedulingConfig corresponding to the first cell, wherein on the existing basis, a field is added to indicate whether it can be indicated to be scheduled by other cells, and indicate related configuration information.

The first cell is the primary cell, such that the original protocol cannot configure other in schedulingCellInfo and only own.

Now add one or more new fields outside schedulingCellInfo, which configure at least one of followings:

1. Information that can be used to schedule the scheduling cell of the first cell.

2. Corresponding to the value of the carrier indicator field.

Optionally, the newly added domain can be configured only when the corresponding cell is the primary cell (PCell or PSCell), and the secondary cell (SCell) cannot be configured with the newly added domain.

In the cross-carrier scheduling configuration information received by the first terminal device, the field schedulingCellInfo is configured with own, and the newly added field is configured (assuming that schedulingCellId indicates the second cell), the first terminal device knows that both the first cell and the second cell can schedule data parameters on the first cell.

The specific protocol is as follows:

| schedulingCellId | ServCellIndex | OPTIONAL, |
|---|---|---|
| cif-InSchedulingCell | INTEGER (1..7) | OPTIONAL, |

Modifying on the basis of the existing RRC IE CrossCarrierSchedulingConfig can reduce the complexity involved in the protocol.

The location and name of the newly added domain in this specific embodiment are only exemplary implementations, and the location and name of the newly added domain are not limited in this application.

Optionally, the first terminal device receives the cross-carrier scheduling configuration information CrossCarrierSchedulingConfig corresponding to the first cell, wherein a field is added on the existing basis to indicate whether self-scheduling is supported.

Now add a new field outside schedulingCellInfo, record it as other2. Optionally, the other2 field can be configured only when the corresponding cell is the primary cell (PCell or PSCell), and the secondary cell (SCell) cannot be configured with this field.

In the cross-carrier scheduling configuration information received by the first terminal device, the field schedulingCellInfo is configured with other (it is assumed that scheduling by the second cell is supported), and the field other2 is configured, the first terminal device knows that both the first cell and the second cell can schedule data parameters on the first cell.

The newly added domain in the foregoing specific embodiment may also be configured in the serving cell configuration information ServingCellConfig corresponding to the first cell or in the first configuration information.

The location and name of the newly added domain in this specific embodiment are only exemplary implementations, and the location and name of the newly added domain are not limited in this application.

Optionally, the first terminal device receives the serving cell configuration information ServingCellConfig corresponding to the first cell, wherein on the existing basis, a field, denoted as FieldX, is added to indicate (2 options).

Option 1:

One or more CORESETs (e.g., newly added fields can indicate one or more CORESET IDs ControlResourceSetId).

Option 2:

One or more search spaces (e.g., a newly added field may indicate one or more search space IDs searchSpaceId).

Optionally, the newly added field is optional, and can be configured only when the corresponding cell is the primary cell (PCell or PSCell), and the secondary cell (SCell) cannot be configured with this field.

For the search space indicated by the newly added FieldX or the search space corresponding to the indicated CORESET, the first terminal device monitors the corresponding PDCCH candidates on the activated second cell.

The specific protocol is as follows:

FiledX type OPTIONAL,

Modifying on the basis of the existing RRC IE ServingCellConfig can reduce the complexity involved in the protocol.

The location and name of the newly added domain in this specific embodiment are only exemplary implementations, and the location and name of the newly added domain are not limited in this application.

Optionally, the first terminal device receives the cross-carrier scheduling configuration information CrossCarrierSchedulingConfig corresponding to the first cell, wherein on the existing basis, a field, denoted as FieldX, is added to indicate (2 options).

Option 1:

One or more CORESETs (e.g., newly added fields can indicate one or more CORESET IDs ControlResourceSetId).

Option 2:

One or more search spaces (e.g., a newly added field may indicate one or more search space IDs searchSpaceId).

Optionally, the newly added field is optional, and can be configured only when the corresponding cell is the primary cell (PCell or PSCell), and the secondary cell (SCell) cannot be configured with this field.

For the search space indicated by the newly added FieldX or the search space corresponding to the indicated CORESET, the first terminal device monitors the corresponding PDCCH candidates on the activated second cell.

The specific protocol is as follows: FieldX type OPTIONAL,

Modifying on the basis of the existing RRC IE CrossCarrierSchedulingConfig can reduce the complexity involved in the protocol.

The location and name of the newly added domain in this specific embodiment are only exemplary implementations, and the location and name of the newly added domain are not limited in this application.

Optionally, all newly added fields may be added to the cross-carrier scheduling configuration information, that is, the FieldX field may be placed in the other1 field, or the FieldX field may be placed outside the other1 field.

The specific protocol is as follows:
FieldX field is put into the other1 field:

```
Other1 SEQUENCE {-- Cross carrier scheduling: scheduled cell
    schedulingCellId ServCellIndex,
    cif-InSchedulingCell INTEGER (1..7),
FiledX type ,
} OPTIONAL,
```

FieldX field is placed outside the other1 field:

```
Other1 SEQUENCE { -- Cross carrier scheduling: scheduled cell
    schedulingCellId ServCellIndex,
    cif-InSchedulingCell INTEGER (1..7)
} OPTIONAL,
```

FiledX type OPTIONAL,
Add the FieldX field outside the schedulingCellInfo field:
schedulingCellId ServCellIndex OPTIONAL,
cif-InSchedulingCell INTEGER (1 . . . 7) OPTIONAL,
FiledX type OPTIONAL, The location and name of the newly added domain in this specific embodiment are only exemplary implementations, and the location and name of the newly added domain are not limited in this application.

Optionally, the first terminal device receives the configuration information of the first search space corresponding to the first cell, wherein on the existing basis, a field is added, denoted as FieldX, which is used to indicate scheduling from this cell or scheduling from other cells. (e.g., second cell).

Optionally, if the newly added field is not configured, the first terminal device monitors the PDCCH candidates corresponding to the first search space from the first cell. If the domain configuration is newly added, the first terminal device monitors the PDCCH candidates corresponding to the first search space from the second cell (it is assumed that the second cell schedules the first cell by cross-carrier).

Optionally, the value of the newly added field indicates a third cell, and the first terminal device monitors the PDCCH candidates corresponding to the first search space from the third cell, where the third cell is the first cell and/or the second cell.

Optionally, the newly added field is optional, and can be configured only when the corresponding cell is the primary cell (PCell or PSCell), and the secondary cell (SCell) cannot be configured with this field.

The newly added domain can be placed inside the ue-Specific domain. The newly added domain can also be placed in other locations.

The specific protocol is as follows:
FiledX type OPTIONAL,
Modifying the existing RRC IE SearchSpace can reduce the complexity involved in the protocol.

The location and name of the newly added domain in this specific embodiment are only exemplary implementations, and the location and name of the newly added domain are not limited in this application.

Optionally, the first terminal device receives the CORESET configuration information of the first control resource set corresponding to the first cell, wherein on the existing basis, a field is added, denoted as FieldX, to indicate scheduling from this cell or scheduling from another cell (for example, the second cell).

Optionally, if the newly added domain is not configured, the first terminal device monitors the PDCCH candidates corresponding to all search spaces corresponding to the first CORESET from the first cell. If the domain configuration is newly added, the first terminal device monitors the PDCCH candidates corresponding to all search spaces corresponding to the first CORESET from the second cell (assuming that the second cell schedules the first cell across carriers).

Optionally, the value of the newly added field indicates a third cell, and the first terminal device monitors PDCCH candidates corresponding to all search spaces corresponding to the first CORESET from the third cell, where the third cell is the first cell and/or the second cell.

Optionally, the newly added field is optional, and can be configured only when the corresponding cell is the primary cell (PCell or PSCell), and the secondary cell (SCell) cannot be configured with this field.

The specific protocol is as follows:
FiledX type OPTIONAL,
Modifying the existing RRC IE ControlResourceSet can reduce the complexity involved in the protocol.

The location and name of the newly added domain in this specific embodiment are only exemplary implementations, and the location and name of the newly added domain are not limited in this application.

Embodiment 1

The first terminal device receives the first configuration information, and the first configuration information is used to indicate the first terminal device to configure at least the first cell and the second cell, wherein the first cell is the primary cell and the second cell is the secondary cell, and at least part of the data transmission in the first cell is scheduled by the control information transmitted on the second cell. Therefore, at least part of the data transmission of the first cell is scheduled through the control information transmitted on the second cell, such that the first cell is scheduled through the second cell. That is, data transmission on the primary cell solves the technical problem that data transmission on the primary cell cannot be scheduled through other carriers.

FIG. 5 is a flowchart of a method for carrier scheduling according to Embodiment 2 of the present application. As illustrated in FIG. 5, the method for carrier scheduling is applied to a network device, and may include the following steps:

In step 210, transmitting, to a first terminal device, a first configuration information by the network device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

For the implementation process of the carrier scheduling method, refer to the implementation process of the corresponding steps in any method for carrier scheduling provided in the above-mentioned specific Embodiment 1, which will not be repeated here.

FIG. 6 is a flowchart of a method for carrier scheduling according to Embodiment 3 of the present application. As illustrated in FIG. 6, the method for carrier scheduling is applied to a second terminal device, and may include the following steps:

In step 310, transmitting, to a first terminal device, a first configuration information by the second terminal device, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

For the implementation process of the method for carrier scheduling, refer to the implementation process of the corresponding steps in any method for carrier scheduling provided in the above-mentioned specific Embodiment 1, which will not be repeated here.

FIG. 7 is a block diagram of a device for carrier scheduling according to Embodiment 4 of the present application. As illustrated in FIG. 7, the device is a terminal device, which may include, but is not limited to, a receiver 410.

The receiver 410 is configured for a first terminal device to receive a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

Optionally, the first configuration information is transmitted through at least one of followings:
the first configuration information being transmitted through a radio resource control (RRC) signaling;
the first configuration information being sent to the first terminal device through a network device; and/or
the first configuration information being sent to the first terminal device through a second terminal device.

Optionally, the receiver is further configured for:
the first terminal device to receive a second configuration information, wherein the second configuration information is used to indicate that the second cell can schedule at least part of the data transmission of the first cell.

Optionally, the second configuration information is transmitted through at least one of followings:
the second configuration information being transmitted through an RRC signaling;
the second configuration information being transmitted through a medium access control control element (MAC CE) signaling; and/or
the second configuration information being transmitted through a downlink control information (DCI) signaling.

Optionally, the second configuration information includes at least one of followings:
the first configuration information carrying the second configuration information;
a serving cell configuration (ServingCellConfig) signaling corresponding to the first cell carrying the second configuration information; and/or
a cross carrier scheduling configuration (CrossCarrier-SchedulingConfig) signaling corresponding to the first cell carrying the second configuration information.

Optionally, at least part of the data transmission of the first cell includes:
at least part of the data transmission of the first cell being self-scheduled by the first cell.

Optionally, the receiver 410 is further configured for:
the first terminal device to receive a third configuration information, wherein the third configuration information is used to indicate that at least part of the data transmission of the first cell can be self-scheduled through the first cell.

Optionally, the receiver 410 is further configured for:
at least part of the data transmission of the first cell being self-scheduled by the first cell according to a protocol.

Optionally, the device for carrier scheduling further includes:
a determination module 430, according to a configuration information of a first search space corresponding to the first cell, determining that the first terminal device monitors a physical downlink control channel (PDCCH) candidate corresponding to the first search space in the first cell and/or the second cell.

Optionally, the determination module 430 is further configured for:
when the first search space is a common search space and/or the second cell is not activated, the first terminal device monitors the PDCCH candidate corresponding to the first search space on the first cell; and/or
when the first search space is a user search space and the second cell is activated, the first terminal device monitors the PDCCH candidate corresponding to the first search space on the second cell.

Optionally, the determination module 430 is further configured for:
when the first search space supports a DCI format 0_0 and a DCI format 1_0 and/or the second cell is not activated, the first terminal device monitors the PDCCH candidate corresponding to the first search space on the first cell; and/or
when the first search space supports a DCI format 0_1 and a DCI format 1_1 and the second cell is activated, the first terminal device monitors the PDCCH candidate corresponding to the first search space on the second cell.

Optionally, the receiver 410 is further configured for:
the first terminal device to receive a fourth configuration information, wherein the fourth configuration information is used to determine that the first terminal device monitors the first search space corresponding to the first cell in the first cell and/or the second cell.

Optionally, the device for carrier scheduling further includes:
a monitor 450 configured for: when the first terminal device does not receive the fourth configuration information, the first terminal device monitors all search spaces corresponding to the first cell on the first cell;
the first terminal device monitoring all search spaces corresponding to the first cell in the activated second cell;
the first terminal device monitoring search spaces of all RRC configurations corresponding to the first cell in the activated second cell;
the first terminal device monitoring a search space indicated by a broadcast message or a system message corresponding to the first cell in the first cell;
the first terminal device monitoring a user search space corresponding to the first cell in the activated second cell; and/or
the first terminal device monitoring a common search space corresponding to the first cell in the first cell.

Optionally, the fourth configuration information includes at least one of followings:

a serving cell configuration (ServingCellConfig) signaling corresponding to the first cell carrying the fourth configuration information;

a cross carrier scheduling configuration (CrossCarrierSchedulingConfig) signaling corresponding to the first cell carrying the fourth configuration information;

a configuration information of the first search space carrying the fourth configuration information; and/or a first control resource set (CORESET) corresponding to the first search space carrying the fourth configuration information.

Optionally, the fourth configuration information indicates the first terminal device to monitor the first search space corresponding to the first cell in the first cell and/or the second cell and/or indicates the first terminal device to monitor a search space corresponding to the first CORESET in the first cell and/or the second cell.

Optionally, the monitor 450 is further configured for:

when the fourth configuration information indicates the first terminal device to monitor the first search space in the first cell, and/or the second cell is not activated, the first terminal device monitors the PDCCH candidate corresponding to the first search space on the first cell;

when the fourth configuration information indicates the first terminal device to monitor the first search space in the second cell and the second cell is activated, the first terminal device monitors the PDCCH candidate corresponding to the first search space on the second cell; and/or when the fourth configuration information indicates the first terminal device to monitor the first search space in the first cell and the second cell and the second cell is activated, the first terminal device monitors the PDCCH candidate corresponding to the first search space on the first cell and the second cell.

Optionally, the fourth configuration information is transmitted through at least one of followings:

the fourth configuration information being transmitted through an RRC signaling;

the fourth configuration information being transmitted through an MAC CE signaling; and/or the fourth configuration information being transmitted through a DCI signaling.

Optionally, part or all of the second configuration information, the third configuration information, and the fourth configuration information are transmitted through the same signaling, or part or all of the second configuration information, the third configuration information, and the fourth configuration information are the same information.

Optionally, the receiver 410 is further configured for:

the first terminal device to receiving a fifth configuration information, wherein the fifth configuration information is used to activate the second cell, and the first terminal device monitors PDCCH candidates associated with the first cell and the second cell on the second cell.

Optionally, the fifth configuration information is transmitted through at least one of followings:

the fifth configuration information being transmitted through an MAC CE signaling; and/or the fifth configuration information being transmitted through a DCI signaling.

For the implementation process of the functions and functions of each module in this embodiment, and other parts that are not described or defined in detail, refer to the description in Embodiment 1 above for details, and will not be repeated here.

FIG. 8 is a block diagram of a device for carrier scheduling according to Embodiment 5 of the present application. As illustrated in FIG. 8, the device is a network device, which may include, but is not limited to, a transmitter 510.

The transmitter 510 is configured for a network device to transmit, to a first terminal device, a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

The implementation process of the functions and functions of each module in this embodiment, and other parts that are not described or defined in detail, refer to the descriptions in Embodiments 1 and 2 above for details, and will not be repeated here.

FIG. 9 is a block diagram of a device for carrier scheduling according to Embodiment 6 of the present application. As illustrated in FIG. 9, the device is a second terminal device, which may include, but is not limited to, a transmitter 610.

The transmitter 610 is configured for a second terminal device to transmit, to a first terminal device, a first configuration information, wherein the first configuration information is used to indicate the first terminal device to configure at least a first cell and a second cell, the first cell is a primary cell, the second cell is a secondary cell, and at least part of data transmission of the first cell is scheduled by a control information transmitted on the second cell.

The implementation process of the functions and functions of each module in this embodiment, and other parts that are not described or defined in detail, refer to the descriptions in Embodiments 1 and 3 above for details, and will not be repeated here.

FIG. 10 is a schematic diagram of the hardware structure of a device for carrier scheduling according to Embodiment 7 of the present application. As illustrated in FIG. 10, the device includes a processor 710 and a memory 720, and the above components of the device are connected to each other through a bus system for communication.

Programs executable on the processor 710 are stored on the memory 720. When the processor 710 executes the program, it implements some or all of the steps of the method for carrier scheduling in the Embodiment 1.

The processor 710 may also be an independent component or may be a collective term for multiple processing components. For example, it may be a central processing unit (CPU), an application specific integrated circuit (ASIC), or one or more integrated circuits configured to implement the above method, such as at least one microprocessor (digital signal processor, DSP) or at least one programmable gate (field programmable gate array, FPGA), etc.

A specific embodiment of the present application further provides a computer-readable storage medium, wherein the computer-readable storage medium stores a computer program, wherein when the computer program is executed, part or all of steps of the method for carrier scheduling in the specific embodiments of are implemented.

Specific embodiments of the present application also provide a computer program product, wherein the computer program product is stored in a non-transitory computer-readable storage medium. When the computer program is executed, part or all of steps of the method for carrier scheduling in the specific embodiments are implemented. The computer program product may be a software installation package.

A specific embodiment of the present application also provides a chip including a processor configured to call and run a computer program from a memory. The device on which the chip is installed performs part or all of steps of the method for carrier scheduling in the specific embodiments.

A specific embodiment of the present application also provides a computer program. When the computer program is executed, part or all of steps of the method for carrier scheduling in the specific embodiments are implemented.

The steps of the method or algorithm described in any the embodiments of the present application may be implemented in hardware or may be implemented by a processor executing software instructions. The software instructions can be composed of corresponding software modules, which can be stored in a random access memory (RAM), a flash memory, a read only memory (ROM), an erasable programmable ROM (EPROM), an electrically EPROM (EEPROM), a register, a hard disk, a portable hard disk, a compact disc read-only memory (CD-ROM), or any other form of storage medium known in the art. An exemplary storage medium can be coupled to a processor, such that the processor can read information from the storage medium and can write information to the storage medium. It is understood that the storage medium may also be an integral part of the processor. The processor and the storage medium may be located in an ASIC. In addition, the ASIC may be located in an access network device, a target network device, or a core network device. It is understood that the processor and the storage medium may also exist, as discrete components, in the access network device, the target network device, or the core network device.

It can be appreciated by those skilled in the art that, in one or more of the above examples, the functions described in the embodiments of the present application may be implemented in whole or in part in software, hardware, firmware, or any combination thereof. When implemented by software, they can be implemented in the form of a computer program product in whole or in part. The computer program product includes one or more computer instructions. When the computer program instructions are loaded and executed on a computer, the processes or functions described in the embodiments of the present application are provided in whole or in part. The computer may be a general purpose computer, an application specific computer, a computer network, or any other programmable device. The computer instructions may be stored in a computer-readable storage medium or transmitted from one computer readable storage medium to another. For example, the computer instructions may be transmitted from one website, computer, server, or data center to another via a wired (such as coaxial cable, optical fiber, digital subscriber line (DSL)) or wireless (such as infrared, wireless, microwave, etc.) connection. The computer readable storage medium may be any usable medium that can be accessed by a computer or a data storage device such as a server or a data center integrated with one or more usable medium. The usable medium may be a magnetic medium (for example, a floppy disk, a hard disk, a magnetic tape), an optical medium (for example, a digital video disc (DVD)), or a semiconductor medium (for example, a solid state disk (SSD)), etc.

The embodiments above further describe the objects, technical solutions, and advantageous effects of the embodiments of the present application in detail. It should be understood that the above are only specific implementations of the embodiments of the present application and are not intended to limit the scope of the embodiments of the present application. Any modifications, equivalents, improvements, etc. that are made on the basis of the technical solutions of the embodiments of the present application are to be encompassed by the scope of the embodiments of the present application.

It should be understood that the present application is not limited to the specific structure that has been described above and shown in the figure. Various modifications and changes can be performed without departing from the scope of the present application, which is defined only by the claims as attached.

What is claimed is:

1. A method for carrier scheduling, applied to a first terminal device, wherein the method comprises:
   receiving a first configuration information by the first terminal device, wherein the first configuration information is used to indicate the first terminal device to configure at least a first cell and a second cell, the first cell is a primary cell, the second cell is a secondary cell, at least part of data transmission of the first cell is scheduled by a control information transmitted on the second cell, and the first configuration information is transmitted through a radio resource control (RRC) signaling;
   receiving a second configuration information by the first terminal device, wherein the second configuration information is used to indicate that the second cell can schedule at least part of the data transmission of the first cell, the second configuration information is transmitted through an RRC signaling, the first configuration information carries the second configuration information, and at least part of the data transmission of the first cell is self-scheduled by the first cell; and
   according to a configuration information of a first search space corresponding to the first cell, determining that the first terminal device monitors a physical downlink control channel (PDCCH) candidate corresponding to the first search space in the first cell and/or the second cell, wherein when the first search space is a common search space and/or the second cell is not activated, the first terminal device monitors the PDCCH candidate corresponding to the first search space on the first cell.

2. The method according to claim 1, wherein the first configuration information is transmitted through at least one of followings:
   the first configuration information being sent to the first terminal device through a network device; and/or
   the first configuration information being sent to the first terminal device through a second terminal device.

3. The method according to claim 1, wherein the second configuration information is transmitted through at least one of followings:
   the second configuration information being transmitted through a medium access control control element (MAC CE) signaling; and/or
   the second configuration information being transmitted through a downlink control information (DCI) signaling.

4. The method according to claim 3, wherein the second configuration information comprises at least one of followings:
   a serving cell configuration (ServingCellConfig) signaling corresponding to the first cell carrying the second configuration information; and/or
   a cross carrier scheduling configuration (CrossCarrierSchedulingConfig) signaling corresponding to the first cell carrying the second configuration information.

5. The method according to claim 1, wherein the method further comprises:

receiving a third configuration information by the first terminal device, wherein the third configuration information is used to indicate that at least part of the data transmission of the first cell can be self-scheduled through the first cell.

6. The method according to claim 1, wherein the method further comprises:
at least part of the data transmission of the first cell being self-scheduled by the first cell according to a protocol.

7. The method according to claim 1, wherein according to the configuration information of the first search space corresponding to the first cell, determining that the first terminal device monitors the PDCCH candidate corresponding to the first search space in the first cell and/or the second cell comprises:
when the first search space is a user search space and the second cell is activated, the first terminal device monitors the PDCCH candidate corresponding to the first search space on the second cell.

8. The method according to claim 1, wherein according to the configuration information of the first search space corresponding to the first cell, determining that the first terminal device monitors the PDCCH candidate corresponding to the first search space in the first cell and/or the second cell comprises:
when the first search space supports a DCI format 0_0 and a DCI format 1_0 and/or the second cell is not activated, the first terminal device monitors the PDCCH candidate corresponding to the first search space on the first cell; and/or
when the first search space supports a DCI format 0_1 and a DCI format 1_1 and the second cell is activated, the first terminal device monitors the PDCCH candidate corresponding to the first search space on the second cell.

9. The method according to claim 1, wherein the method further comprises:
receiving, by the first terminal device, a fourth configuration information, wherein the fourth configuration information is used to determine that the first terminal device monitors the first search space corresponding to the first cell in the first cell and/or the second cell.

10. The method according to claim 9, wherein the method further comprises:
when the first terminal device does not receive the fourth configuration information, the first terminal device monitors all search spaces corresponding to the first cell on the first cell;
the first terminal device monitoring all search spaces corresponding to the first cell in an activated second cell;
the first terminal device monitoring search spaces of all RRC configurations corresponding to the first cell in the activated second cell;
the first terminal device monitoring a search space indicated by a broadcast message or a system message corresponding to the first cell in the first cell;
the first terminal device monitoring a user search space corresponding to the first cell in the activated second cell; and/or
the first terminal device monitoring a common search space corresponding to the first cell in the first cell.

11. The method according to claim 9, wherein the fourth configuration information comprises at least one of followings:

a serving cell configuration (ServingCellConfig) signaling corresponding to the first cell carrying the fourth configuration information;
a cross carrier scheduling configuration (CrossCarrierSchedulingConfig) signaling corresponding to the first cell carrying the fourth configuration information;
a configuration information of the first search space carrying the fourth configuration information; and/or
a first control resource set (CORESET) corresponding to the first search space carrying the fourth configuration information.

12. The method according to claim 11, wherein the fourth configuration information indicates the first terminal device to monitor the first search space corresponding to the first cell in the first cell and/or the second cell and/or indicates the first terminal device to monitor a search space corresponding to the first CORESET in the first cell and/or the second cell.

13. The method according to claim 9, wherein the method further comprises:
when the fourth configuration information indicates the first terminal device to monitor the first search space in the first cell, and/or the second cell is not activated, the first terminal device monitors the PDCCH candidate corresponding to the first search space on the first cell;
when the fourth configuration information indicates the first terminal device to monitor the first search space in the second cell and the second cell is activated, the first terminal device monitors the PDCCH candidate corresponding to the first search space on the second cell; and/or
when the fourth configuration information indicates the first terminal device to monitor the first search space in the first cell and the second cell, and the second cell is activated, the first terminal device monitors the PDCCH candidate corresponding to the first search space on the first cell and the second cell.

14. The method according to claim 9, wherein the fourth configuration information is transmitted through at least one of followings:
the fourth configuration information being transmitted through an RRC signaling;
the fourth configuration information being transmitted through an MAC CE signaling; and/or
the fourth configuration information being transmitted through a DCI signaling.

15. The method according to claim 1, wherein part or all of the second configuration information, a third configuration information, and a fourth configuration information are transmitted through a same signaling, or part or all of the second configuration information, the third configuration information, and the fourth configuration information are a same information.

16. The method according to claim 1, wherein the method further comprises:
receiving a fifth configuration information by the first terminal device, wherein the fifth configuration information is used to activate the second cell, the first terminal device monitors PDCCH candidates associated with the first cell and the second cell on the second cell, and the fifth configuration information is transmitted through an MAC CE signaling.

17. A method for carrier scheduling, applied to a network device, wherein the method comprises:
transmitting, to a first terminal device, a first configuration information by the network device, wherein the first configuration information is used to indicate the first terminal device to configure at least a first cell and a second cell, the first cell is a primary cell, the second cell is a secondary cell, at least part of data transmission of the first cell is scheduled by a control information transmitted on the second cell, and the first configuration information is transmitted through a radio resource control (RRC) signaling;

transmitting, to the first terminal device, a second configuration information by the network device, wherein the second configuration information is used to indicate that the second cell can schedule at least part of the data transmission of the first cell, the second configuration information is transmitted through an RRC signaling, the first configuration information carries the second configuration information, and at least part of the data transmission of the first cell is self-scheduled by the first cell; and according to a configuration information of a first search space corresponding to the first cell, determining that the network device controls the first terminal device to monitor a physical downlink control channel (PDCCH) candidate corresponding to the first search space in the first cell and/or the second cell, wherein when the first search space is a common search space and/or the second cell is not activated, the network device controls the first terminal device to monitor the PDCCH candidate corresponding to the first search space on the first cell.

18. A device for carrier scheduling, wherein the device comprises a processor connected to a memory storing programs executable by the processor, and the device comprises:

a receiver configured for a first terminal device to receive a first configuration information, wherein the first configuration information is used to indicate the first terminal device to configure at least a first cell and a second cell, the first cell is a primary cell, the second cell is a secondary cell, at least part of data transmission of the first cell is scheduled by a control information transmitted on the second cell, and the first configuration information is transmitted through a radio resource control (RRC) signaling; wherein the receiver is further configured for: the first terminal device to receive a second configuration information, wherein the second configuration information is used to indicate that the second cell can schedule at least part of the data transmission of the first cell, the second configuration information is transmitted through an RRC signaling, the first configuration information carries the second configuration information, at least part of the data transmission of the first cell is self-scheduled by the first cell; and a determination module configured to cause the processor, according to a configuration information of a first search space corresponding to the first cell, to determine that the first terminal device monitors a physical downlink control channel (PDCCH) candidate corresponding to the first search space in the first cell and/or the second cell, wherein when the first search space is a common search space and/or the second cell is not activated, the first terminal device monitors the PDCCH candidate corresponding to the first search space on the first cell.

19. The device according to claim 18, wherein the first configuration information is transmitted through at least one of followings:

the first configuration information being sent to the first terminal device through a network device; and/or the first configuration information being sent to the first terminal device through a second terminal device.

20. The device according to claim 18, wherein the second configuration information is transmitted through at least one of followings:

the second configuration information being transmitted through a medium access control control element (MAC CE) signaling; and/or the second configuration information being transmitted through a downlink control information (DCI) signaling.

* * * * *